Patented Feb. 13, 1940

2,190,607

UNITED STATES PATENT OFFICE 2,190,607

SALICYLALDEHYDE PURIFICATION

Ralph P. Perkins, Midland, Mich., assignor to The Dow Chemical Company, Midland, Mich., a corporation of Michigan No Drawing. Application February 11, 1937, Serial No. 125,221

3 Claims. (Cl. 260—600)

This invention relates to a method of purifying crude salicylaldehyde, such as that obtained by the Reimer-Tiemann reaction, in which an alkaline solution of phenol is reacted with chloroform.

Such process ordinarily yields a crude product containing about 30–34 per cent of salicylaldehyde and about 64–68 per cent of phenol, the balance being water. This crude product can be worked up by known methods to obtain a material in which the salicylaldehyde content is between about 65 and about 85 per cent by weight. The principal impurity is phenol. Further purification is difficult owing to the proximity of the boiling points of salicylaldehyde and phenol and to their tendency to distil together from such crude mixture.

I have now found a method for further purifying the crude salicylaldehyde from phenol whereby such impure product, containing 65–85 per cent of salicylaldehyde, can be treated to recover the aldehyde almost quantitatively therefrom in substantially pure form. The procedure which I have found effective for accomplishing this result includes reacting the impure salicylaldehyde, in an alkaline medium, with an alkaline earth metal compound capable of precipitating salicylaldehyde as its corresponding metal salt, substantially free from the alkaline earth metal salts of phenol. The precipitants which I prefer to employ are selected from the group consisting of the hydroxides and water-soluble salts of calcium, barium, strontium, and magnesium. The compounds which have been found to be most generally satisfactory are the hydroxides or water-soluble salts of calcium and/or magnesium. Such metal salts of salicylaldehyde can then be treated with an acid, and the reaction product steam distilled or separated by gravity, to recover the purified salicylaldehyde. It is to be understood that the expression "salts of salicylaldehyde" herein employed refers to the alkali metal hydroxylates of salicylaldehyde.

The metal salts of salicylaldehyde can be formed readily by treating a dilute solution of salicylaldehyde in aqueous ammonia or other alkaline medium with aqueous calcium chloride solution, or by adding the crude salicylaldehyde slowly to an aqueous slurry of lime or hydrated magnesia, with stirring. When following the latter procedure, the proportion of alkaline earth metal compound used is in excess of 0.5 mol for each mol of aldehyde and phenol present. The slurry or solution, therefore, should contain about 37 to about 50 pounds or more of hydrated lime or equivalent alkaline earth metal compound, suitably in about 300–500 pounds or more of water for each 100 pounds of crude salicylaldehyde oil containing 65–85 per cent of the aldehyde. After all of the aldehyde has been precipitated the metal salt of salicylaldehyde is separated by filtration and the crystals washed thoroughly with water to remove any adhering mother liquor. The filter cake so obtained, without drying or further treatment, can be broken up and the crystals suspended in a relatively small amount of water, which is then made slightly acid, e. g. with hydrochloric acid or other mineral acid, or an organic acid such as acetic acid. The purified salicylaldehyde can then be separated readily from the mixture, e. g. by steam distillation, and, if desired, redistilled to remove any water therein.

The following example illustrates the practice of my invention:

Example 2000 grams of crude salicylaldehyde obtained by concentrating the product of a Reimer-Tiemann reaction, and having the approximate analysis of 70 per cent salicylaldehyde, 18 per cent phenol, and 12 per cent water, was added at a uniform rate over a period of about 30 minutes with stirring to a slurry of 822 grams of hydrated high-calcium lime in 10 liters of water. Agitation was continued for another 30 minutes. The calcium salt of salicylaldehyde formed as a yellow precipitate, which was separated from the mother-liquor by filtration. The precipitate was washed in the filter with 4 portions of water totalling 16 liters, after which the washed precipitate was removed from the filter and suspended in 5 liters of water. To this suspension was added 1500 cc. of 37 per cent hydrochloric acid, which was slightly more than sufficient to liberate the aldehyde from its calcium salt. The oil layer comprising salicylaldehyde was separated, and the remaining water layer extracted with 500 cc. of benzene. The benzene extract was added to the previously separated oil layer and the combined portions were distilled, whereby there was obtained 1300 grams of salicylaldehyde of 99.3 per cent purity, having a freezing point of 1.6° C. This represents a recovery of 92.9 per cent of the salicylaldehyde present in the original crude mixture.

Similar results are obtained through the employment of magnesium hydroxide instead of the calcium hydroxide used in the foregoing example. Although the invention has been illustrated with reference to the purification of a crude salicylaldehyde of approximately 70 per cent aldehyde concentration, it may also be applied to the original reaction mixture obtained by the Reimer-Tiemann process. As previously stated, such mixture ordinarily contains approximately 35 per cent of crude salicylaldehyde. Application of the present invention to such crude materials results in a recovery of about 90 per cent of the salicylaldehyde having a purity of approximately 90 to 97 per cent.

If it is desired to recover phenol from the crude reaction mixture, this may readily be accomplished by suitable treatment of the mother liquors and washings from the calcium salt of the salicylaldehyde obtained during the filtration step described in the example. For example, sufficient soda ash or other soluble carbonate is added to the mother liquors to precipitate as calcium carbonate the soluble calcium compounds present. The supernatant liquor is removed from this precipitate and evaporated to form a solution of sodium phenolate of any desired concentration. This solution may be returned to the Reimer-Tiemann reaction for the preparation of further amounts of salicylaldehyde or may be acidified to recover phenol as such.

Alkaline earth metal compounds other than calcium hydroxide or hydrated magnesia may be employed instead of those herein described. The precipitating agent may be a high-calcium or high-magnesium lime or any intermediate grade of such materials, or it may be a hydroxide of barium or strontium. Water-soluble salts of calcium, barium, strontium or magnesium which may be employed include the chlorides, nitrates, sulfates (where soluble), acetates, citrates, etc.

The herein-described process has, among others, the following advantages over those previously employed: (1) the plant required is simpler than that needed in the well-known bisulphite process; (2) the equipment employed need not be acid-proof as the reaction is carried out, in the majority of its steps, in an alkaline medium; (3) it permits easy recovery of phenol in a form suitable for re-use in the preparation of salicylaldehyde or for other purposes.

Other modes of applying the principle of my invention may be employed instead of those explained, change being made as regards the method herein disclosed, provided the step or steps stated by any of the following claims or the equivalent of such stated step or steps be employed.

I, therefore, particularly point out and distinctly claim as my invention:

1. In a method of purifying crude salicylaldehyde which contains phenol, the steps which consist in reacting the same in water with at least 0.5 mol, for each mol of salicylaldehyde and phenol present, of a hydroxide of a metal of the group consisting of calcium, strontium, barium and magnesium, separating the so-formed metal hydroxylate of salicylaldehyde from the aqueous medium, decomposing the hydroxylate by acidification, and recovering the so-purified salicylaldehyde.

2. In a method of purifying crude salicylaldehyde which contains phenol, the steps which consist in reacting the same with a water suspension of at least 0.5 mol of calcium hydroxide for each mol of salicylaldehyde and phenol present, separating the so-formed calcium hydroxylate of salicylaldehyde from the aqueous medium, decomposing the calcium hydroxylate by acidification, and recovering the so-purified salicylaldehyde.

3. In a method of purifying crude salicylaldehyde which contains phenol, the steps which consist in reacting the same with a water suspension of at least 0.5 mol of hydrated magnesia for each mol of salicylaldehyde and phenol present, separating the so-formed magnesium hydroxylate of salicylaldehyde from the aqueous medium, decomposing the magnesium hydroxylate by acidification, and recovering the so-purified salicylaldehyde.

RALPH P. PERKINS.